United States Patent [19]
Nakamura

[11] Patent Number: 5,793,455
[45] Date of Patent: *Aug. 11, 1998

[54] ELLIPTICALLY POLARIZING PLATE AND LIQUID CRYSTAL DISPLAY IN WHICH A COMPENSATION SHEET DIRECTION OF NON-ZERO MINIMUM RETARDATION IS INCLINED AT 5 TO 50 DEGREES

[75] Inventor: Taku Nakamura, Kanagawa, Japan

[73] Assignee: Fuji Photo Film Co., Ltd., Minami-ashigara, Japan

[*] Notice: The term of this patent shall not extend beyond the expiration date of Pat. No. 5,568,290.

[21] Appl. No.: 667,873

[22] Filed: Jun. 20, 1996

Related U.S. Application Data

[63] Continuation-in-part of Ser. No. 345,688, Nov. 21, 1994, Pat. No. 5,568,290.

[30] Foreign Application Priority Data

Nov. 22, 1993 [JP] Japan ................ 5-291846
Jul. 6, 1994 [JP] Japan ................ 6-154774

[51] Int. Cl.$^6$ ........................... G02F 1/1335
[52] U.S. Cl. ............... 349/96; 349/117; 349/118
[58] Field of Search ................ 349/96, 117, 118

[56] References Cited

U.S. PATENT DOCUMENTS

| | | | |
|---|---|---|---|
| 4,272,694 | 6/1981 | Jacobs | 359/329 |
| 4,430,650 | 2/1984 | Billard et al. | 349/182 |
| 4,678,287 | 7/1987 | Buhrer | 359/498 |
| 5,189,538 | 2/1993 | Arakawa | 349/118 |
| 5,245,456 | 9/1993 | Yoshimi et al. | 349/118 |
| 5,326,496 | 7/1994 | Iida et al. | 252/299.01 |
| 5,375,006 | 12/1994 | Haas | 349/117 |
| 5,568,290 | 10/1996 | Nakamura | 349/117 |

FOREIGN PATENT DOCUMENTS

| | | |
|---|---|---|
| 0529813 | 3/1993 | European Pat. Off. |
| 0576304 | 12/1993 | European Pat. Off. |
| 86-159616 | 5/1986 | Japan |
| 4-277719 | 10/1992 | Japan |
| 5-027119 | 2/1993 | Japan |

OTHER PUBLICATIONS

Hecht, "Schaum's outline Series Theory and Problems of Optics", McGraw Hill Book Co., 1975, pp. 99–101.

Primary Examiner—William L. Sikes
Assistant Examiner—Walter Malinowski
Attorney, Agent, or Firm—Burns, Doane, Swecker & Mathis, LLP

[57] ABSTRACT

Disclosed is an elliptically polarizing plate comprising a polarizing film and an optical compensatory sheet provided, in which the compensatory sheet has a direction of a minimum retardation inclined at 5 to 50 degrees from the normal of the sheet. A process for preparation of the elliptically polarizing plate, and a liquid crystal display provided with the elliptically polarizing plate are also disclosed.

19 Claims, 5 Drawing Sheets

ELLIPTICALLY POLARIZING PLATE AND LIQUID CRYSTAL DISPLAY IN WHICH A COMPENSATION SHEET DIRECTION OF NON-ZERO MINIMUM RETARDATION IS INCLINED AT 5 TO 50 DEGREES

CROSS-REFERENCE TO RELATED APPLICATION

This is a Continuation-In-Part application of U.S. patent application Ser. No. 08/345,688 on Nov. 21, 1994 now U.S. Pat. No. 5,568,290.

BACKGROUND OF THE INVENTION

1. Field of the Invention

The present invention relates to an elliptically polarizing plate which is useful for a liquid crystal display, a process for preparation of the elliptically polarizing plate and a liquid crystal display provided with the elliptically polarizing plate.

2. Description of Prior Art

As a display for electronic office system-devices such as a desk-top personal computer and a word processor, CRT (cathode ray tube) has been employed so far. Recently, a liquid crystal display (hereinafter referred to as LCD) is increasingly employed instead of the CRT because of its thin thickness, light weight and low power consumption. LCD generally has a structure in that a liquid crystal cell is disposed between a pair of polarizing sheets. Most of LCD use a twisted nematic liquid crystal. Operational mode of LCD using the twisted nematic liquid crystal is roughly divided into birefringence mode and optical rotatory mode.

A super twisted nematic liquid crystal display (hereinafter referred to as STN-LCD) utilizing the birefringence mode uses a super twisted nematic liquid crystal showing a twisted angle of more than 90 degrees and having steep electro-optical characteristics. Such STN-LCD, therefore, has an advantage of giving display of a large capacity by driving in time-sharing mode. However, the STN-LCD has disadvantages such as slow response (several hundred milliseconds) and difficulty in giving satisfactory gradation on display, and therefore its display characteristics are relatively poor, as compared with display characteristics of a liquid crystal display using the known active-type elements (e.g., TFT-LCD and MIM-LCD).

In the TFT-LCD and MIM-LCD, twisted nematic liquid crystal showing a twisted angle of 90 degrees is employed for displaying an image. This is called LCD of an optically rotary mode (i.e., TN-LCD). TN-LCD display mode shows fast response (several tens of milliseconds) and high display contrast, and easily gives black-white display of high contrast. Hence, the optical rotatory mode has a number of advantages compared with the birefringence mode or other modes. However, TN-LCD has disadvantages that color or contrast on display varies depending upon viewing direction to a liquid crystal display, and its display characteristics are not comparable to display characteristics of CRT.

In order to improve the viewing angle characteristics (i.e. to enlarge the viewing angle), arrangement of a phase difference film (optical compensatory sheet) between a pair of polarizing plates and TN liquid crystal cell has been proposed in Japanese Patent Provisional Publications No. 4(1992)-229828 and No. 4(1992)-258923.

The phase difference films proposed in these Publications show no optical effect when a liquid crystal display is seen from the direction vertical to a screen of the display because phase difference in the direction perpendicular to a surface of the liquid crystal display is almost zero. However, the phase difference film serves for compensation of phase difference (depending upon wavelengths of light) that occurs when the liquid crystal display is viewed from an oblique direction. The phase difference results in unfavorable viewing angle characteristics such as coloring and disappearance of displayed image.

The liquid crystal display provided with such phase difference film is still not improved particularly in coloring of a displayed image and reversing of black-and-white image when the viewing direction to the liquid crystal display is greatly inclined to height or width direction from the normal of a surface of the screen. Thus, such liquid crystal display cannot be satisfactorily employed instead of CRT, and further is not suitable for loading on a vehicle (e.g., motor car).

Japanese Patent Provisional Publications No. 4(1992)-366808 and No. 4(1992)-366809 disclose a difference phase film of a liquid crystal cell comprising a chiral nematic liquid crystal that an optic axis is inclined so as to enlarge the viewing angle. The difference phase film is composed of two liquid crystal cells, and therefore needs a complicated process for its preparation and brings about increase of its weight.

Japanese Patent Provisional Publications No. 4(1992)-113301, No. 5(1993)-8323 and No. 5(1993)-157913 disclose a phase difference film of polymer chain whose optic axis or an optical elastic axis is inclined from a surface of a liquid crystal cell. The phase difference film is prepared by slicing obliquely a uniaxial polycarbonate film, and therefore a phase difference film of a large area cannot be easily prepared according to the disclosed process. Further, the publications are for inventions with regard to STN-LCD and therefore give no teachings as to the use with TN-LCD.

Japanese Patent Provisional Publication No. 5(1993)-215921 discloses the use of a birefringence plate comprising a pair of supports and a rod-like compound showing liquid crystal property. The rod-like compound showing liquid crystal property is prepared by interposing and curing the compound to compensate difference phase of LCD. However, the birefringence plate has the same structure as one of the two liquid crystal cell as mentioned above, and therefore needs a complicated process for its preparation, which is not suitable for mass production. Further, its structure brings about increase of weight. Furthermore, the publications are for inventions with regard to STN-LCD and therefore give no teachings as to the use for TN-LCD.

Japanese Patent Provisional Publications No. 3(1991) 9326 and No. 3(1991)-291601 disclose an optical compensatory sheet for LCD which is prepared by coating a solution of a polymer showing liquid crystal property on an orientation layer provided on a support film. However, the polymer showing liquid crystal property is not satisfactorily oriented on the orientation layer. Hence, the resulting compensatory sheet scarcely enlarges the viewing angle from all directions.

EP 0576302 A1 discloses a phase difference plate comprising a material having optical anisotropy in a flat plate in which the direction of the principal refractive index of the index ellipsoid is inclined from the normal of the surface. The disclosed phase difference plate shows great enlargement of the viewing angle compared with other known phase difference films as mentioned above. However, LCD provided with such phase difference plate is not comparable to CRT in the viewing angle characteristics.

U.S. patent application Ser. No. 08/310,101 proposes a liquid crystal display having an optical compensatory sheet which is greatly improved in coloring of a displayed image and reversing of black-and-white image when the viewing direction to the liquid crystal display is greatly inclined, these characteristics having discussed previously. In more detail, the optical compensatory sheet comprising a transparent support and a layer provided thereon which is prepared using a discotic liquid crystal of a low molecular weight.

The liquid crystal display generally has a structure that comprises a liquid crystal cell which comprises a pair of substrates provided with a transparent electrode and twist-oriented nematic liquid crystal sealed therebetween, a pair of polarizing sheets arranged on both sides of the cell, and an optical compensatory sheet provided between the liquid crystal cell and the polarizing sheet. The polarizing sheet has a structure consisting of a polarizing film (e.g., polyvinyl alcohol film to which iodide is adsorbed) and two protective films provided on both sides of the film (e.g., triacetylcellulose film). The optical compensatory sheet, therefore, is generally placed on the protective film of the polarizing film using an adhesive (to obtain an elliptically polarizing plate) and another surface of the optical compensatory sheet is bonded to the substrate of the liquid crystal cell to prepare a liquid crystal display.

In the study of the liquid crystal display, the inventor has discovered that preservation of the display under the conditions of high temperature or humidity occasionally brings about occurrence of peeling and/or bubbles between the optical compensatory sheet and the protective film, and occurrence of shriveling on edges of the sheet. Further, he has discovered that the protective film of the polarizing film disturbs increase of viewing angle that the optical compensatory sheet gives.

SUMMERY OF THE INVENTION

It is an object of the present invention to provide a novel elliptically polarizing plate which is, when it is fixed on a liquid crystal cell, capable of improving durability under the conditions of high temperature or humidity, and is capable of greatly enlarging the viewing angle.

It is another object of the present invention to provide a process for preparation of the novel elliptically polarizing plate.

It is a further object of the present invention to provide a liquid crystal display provided with a novel elliptically polarizing plate which is improved in durability under the conditions of high temperature or humidity, and is greatly improved in coloring of a displayed image and reversing of black-and-white image when the viewing direction to the liquid crystal display is greatly inclined from the normal to a surface of the screen, and further shows high contrast when the liquid crystal display is seen from the direction vertical to a screen of the display.

There is provided by the invention an elliptically polarizing plate comprising a polarizing film and an optical compensatory sheet provided thereon, said sheet having a direction of a minimum retardation inclined at 5 to 50 degrees from the normal of the sheet.

The direction of a minimum retardation means a direction showing the minimum of retardation of the optical compensatory sheet. The direction of a minimum retardation of 0 nm is referred to an optic axis.

Preferred embodiments of the elliptically polarizing plate of the present invention are as follows:

1) The elliptically polarizing plate wherein the minimum retardation is a value other than 0 nm.
2) The elliptically polarizing plate wherein the optical compensatory sheet has an oriented layer of a discotic compound (preferably an oriented layer of a discotic liquid crystal).
3) The elliptically polarizing plate wherein the optical compensatory sheet comprises a transparent film and an oriented layer of a discotic liquid crystal provided thereon.
4) The elliptically polarizing plate wherein the elliptically polarizing plate comprising the polarizing film, the optical compensatory sheet on one side of the film and a transparent film on another side of the film.
5) The elliptically polarizing plate wherein an orientation layer is provided between the transparent film and the layer of a discotic liquid crystal.
6) The elliptically polarizing plate defined in 5) above wherein the orientation layer is a polymer layer which has been subjected to rubbing treatment.
7) The elliptically polarizing plate defined in 5) above wherein the orientation layer is prepared by obliquely depositing an inorganic compound on the support.
8) The elliptically polarizing plate defined in 3) above, wherein the transparent film has a light transmittance of not less than 80%, shows optically isotropy on the plane of the film, and satisfies the condition of:

$$30 \leq \{(nx+ny)/2-nz\} \times d \leq 150$$

in which nx and ny are main refractive indices on the plane of the support, nz is a main refractive index in the thickness direction, and d is the thickness of the film, unit of d being nm.

9) The elliptically polarizing plate defined in 3) above wherein the transparent film is a triacetyl cellulose film.
10) The elliptically polarizing plate wherein the minimum retardation is in the range of 2 to 20 nm (especially in the range of 3 to 15 nm).

The elliptically polarizing plate of the invention can be advantageously prepared by a process for preparation of an elliptically polarizing plate which comprises sandwiching a polarizing film with an optical compensatory sheet and a transparent film by passing the optical compensatory sheet, polarizing film, and transparent film simultaneously between a pair of rollers, said sheet having a direction of a minimum retardation inclined at 5 to 50 degrees from the normal of the element.

Preferred embodiments of the process of the invention are as follows:

1) The process wherein the optical compensatory sheet, polarizing film, and transparent film are passed between a pair of rollers after an adhesive is applied between the optical compensatory sheet and polarizing film, and between the optical compensatory sheet and transparent film.
2) The process wherein the optical compensatory sheet comprises a transparent film, an orientation layer thereon and an oriented layer of a discotic liquid crystal provided on the orientation layer.

Further, there is provided by a liquid crystal display comprising a liquid crystal cell which comprises a pair of substrates provided with a transparent electrode and etwisto-riented nematic liquid crystal sealed therebetween, and the elliptically polarizing plate defined above which is arranged on at least one side of the cell.

Preferred embodiment of the display of the invention is as follows:

1) The liquid crystal display wherein two elliptically polarizing plates defined above are arranged on both sides of the cell.

The elliptically polarizing plate of the invention is, in the case of providing a liquid crystal cell with the plate, capable of improving durability under the conditions of high temperature and/or humidity, and is capable of greatly improving coloring of a displayed image and reversing of black-and-white image when the viewing direction to the liquid crystal display is greatly inclined from the normal of a surface of the screen, and further shows high contrast when the liquid crystal display is seen from the direction vertical to a screen of the display. Thus, the liquid crystal display provided with the plate is improved in durability under the conditions of a high temperature and humidity and is greatly improved in viewing characteristics such as increase of viewing angle.

Further, the elliptically polarizing plate of the invention has no protective film of at least one side of the polarizing film and therefore the liquid crystal display with the sheet is greatly improved in viewing characteristics such as increase of viewing angle compared with one having the protective film. Furthermore, the liquid crystal display of the invention can be prepared without laminating the optical compensatory sheet and the protective film of the polarizing film, so that the display can be prepared by a process having high productivity.

DETAILED DESCRIPTION OF THE INVENTION

The elliptically polarizing plate of the invention is characterized by the use of a polarizing film (e.g., polyvinyl alcohol film containing iodine) and the novel optical compensatory sheet. The elliptically polarizing plate is explained referring to FIGS. 1 to 3.

Figure 1:
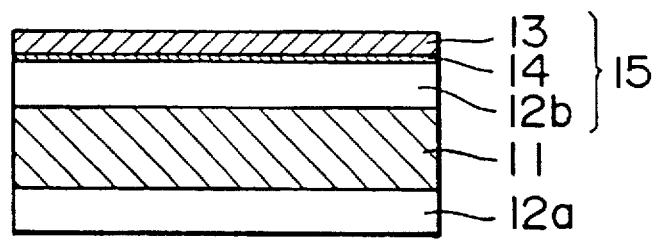
FIG. 1 is a sectional view schematically showing the representative structure of the elliptically polarizing plate of the invention.

The representative structure of the elliptically polarizing plate of the invention is shown in FIG. 1. In FIG. 1, a transparent film 12b, an orientation layer 14 and a layer of discotic liquid crystal 13 are superposed in order, to constitute an optical compensatory sheet 15. The optical compensatory sheet 15 is bonded to a polarizing film 11 in such a manner that the transparent film 12b is positioned in contact with the polarizing film 11, and a transparent film 12a is bonded to another side of the polarizing film 11. The transparent film 12a may be any film so long as it has transparency. The transparent film 12a may be the optical compensatory sheet 15. The transparent film 12a preferably is a film showing optical isotropy on the plane of the film or a film having an optically negative monoaxial property. The optical compensatory sheet 15 may be any film so long as the film has a direction of a minimum retardation inclined at 5 to 50 degrees from the normal of the sheet.

The elliptically polarizing plate is, for example, obtained by sandwiching a polarizing film with an optical compensatory sheet (which has a direction of a minimum retardation inclined at 5 to 50 degrees from the normal of the sheet) and a transparent film by passing the optical compensatory sheet, polarizing film, and transparent film simultaneously between a pair of rollers. In this process, the optical compensatory sheet and the polarizing film can be combined using an adhesive. The polarizing film and the transparent film also can be combined using an adhesive.

Figure 2:
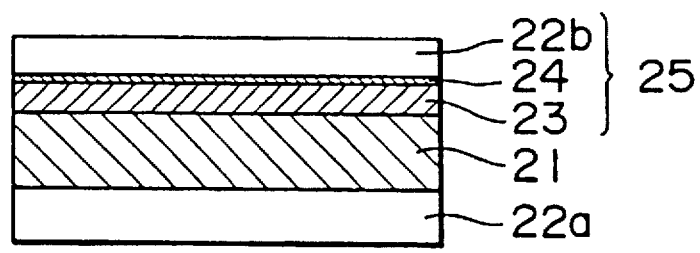
FIG. 2 is a sectional view schematically showing another structure of the elliptically polarizing plate of the invention.

Another example of the structure of the elliptically polarizing plate of the invention is shown in FIG. 2. In FIG. 2, a transparent film 22b, an orientation layer 24 and a layer of discotic liquid crystal 23 are superposed in order, to constitute an optical compensatory sheet 25. The optical compensatory sheet 25 is bonded to a polarizing film 21 in such a manner that the layer of discotic liquid crystal 23 is placed in contact with the polarizing film 21, and a transparent support 22a is bonded to another side of the polarizing film 21.

Figure 3:
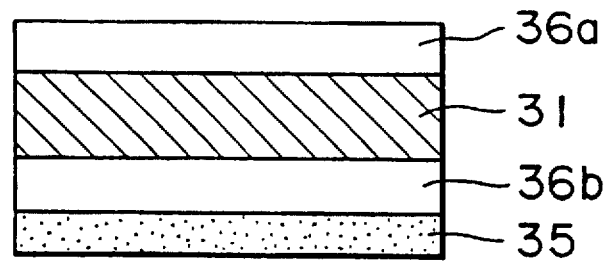
FIG. 3 is a sectional view schematically showing a conventional structure of the elliptically polarizing plate.

The structure of the conventional elliptically polarizing plate is shown in FIG. 3. In FIG. 3, a protective film 36a is bonded to one side of a polarizing film 31, while a protective film 36b is bonded to another side of the polarizing film 31. Further, the optical compensatory sheet 35 (e.g., a film having an optically negative monoaxial) is bonded to the protective film 36b of the polarizing film 31 to prepare an elliptically polarizing plate. Thus, the conventional elliptically polarizing plate needs two laminating procedures, whereas the plate of the invention can be prepared by only one sandwiching procedure.

The liquid crystal display of the invention is characterized by the use of the above elliptically polarizing plate.

Figure 4:
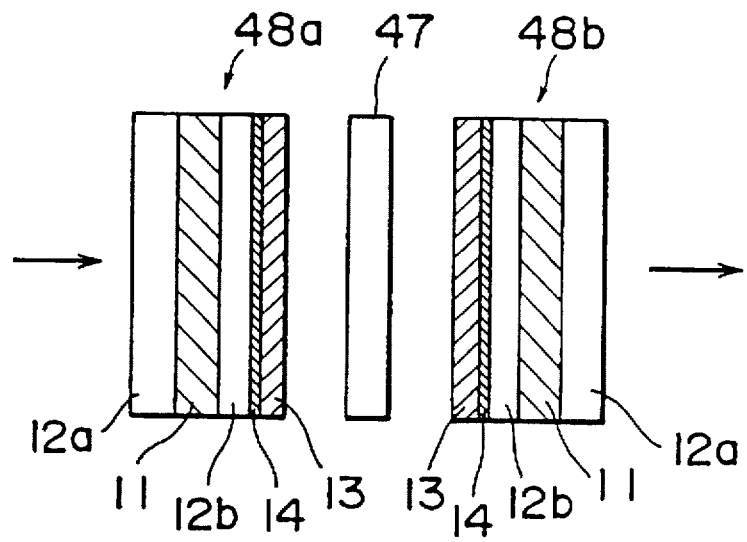
FIG. 4 is a sectional view schematically showing a representative structure of the liquid crystal display of the invention.

A representative structure of the liquid crystal display of the invention is shown in FIG. 4. The liquid crystal display has a liquid crystal cell 47 and a pair of the elliptically polarizing plates indicated in FIG. 1 on both sides of the cell.

In FIG. 4, a liquid crystal cell 47 comprises a pair of substrates provided with a transparent electrode and a twist-oriented nematic liquid crystal sealed therebetween, a pair of elliptically polarizing plates 48a and 48b arranged on the both sides of the cell. The twisted angle of the liquid crystal preferably is 90 degrees or in the vicinity of 90 degrees. The elliptically polarizing plate 48a is arranged on one side of the liquid crystal cell 47 in such a manner that the discotic liquid crystal layer 13 of the plate 48a faces the liquid crystal cell 47, and the elliptically polarizing plate 48b is arranged on another side of the liquid crystal cell 47 in such a manner that the discotic liquid crystal layer 13 of the plate 48b faces the liquid crystal cell 47.

One of the elliptically polarizing plates 48a and 48b may be a conventional polarizing plate composed of a polarizing film and two protective films. The elliptically polarizing plate of the invention is preferably arranged on the light source side.

Figure 5:
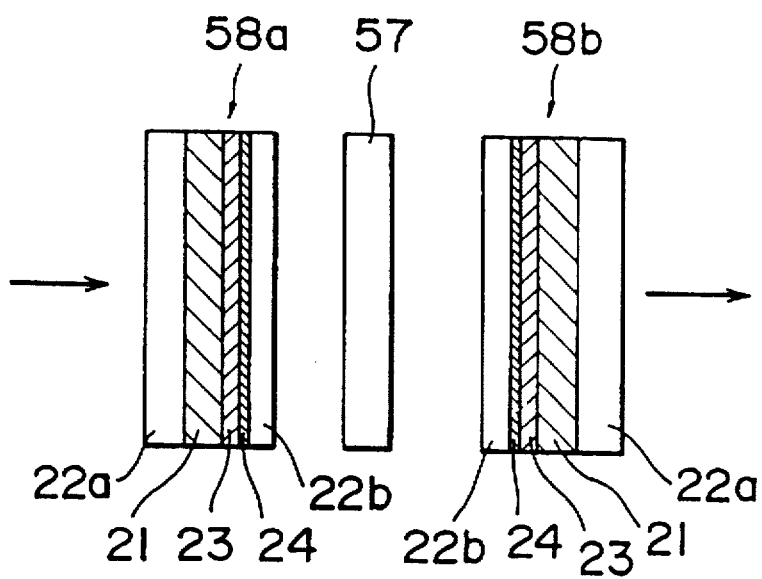
FIG. 5 is a sectional view schematically showing another structure of the liquid crystal display of the invention.

A representative structure of the liquid crystal display of the invention is shown in FIG. 5. The liquid crystal display has a liquid crystal cell 57 and a pair of the elliptically polarizing plates indicated in FIG. 2 on both sides of the cell.

In FIG. 5, a liquid crystal cell 57 comprises a pair of substrates provided with a transparent electrode and a twist-oriented nematic liquid crystal sealed therebetween, a pair of elliptically polarizing plates 58a and 58b arranged on the both sides of the cell. The elliptically polarizing plate 58a is arranged on one side of the liquid crystal cell 57 in such a manner that the transparent film 22b of the plate 58a faces the liquid crystal cell 57, and the elliptically polarizing plate 58b is arranged on another side of the liquid crystal cell 57 in such a manner that the transparent film 22b of the plate 58b faces the liquid crystal cell 57.

Figure 6:
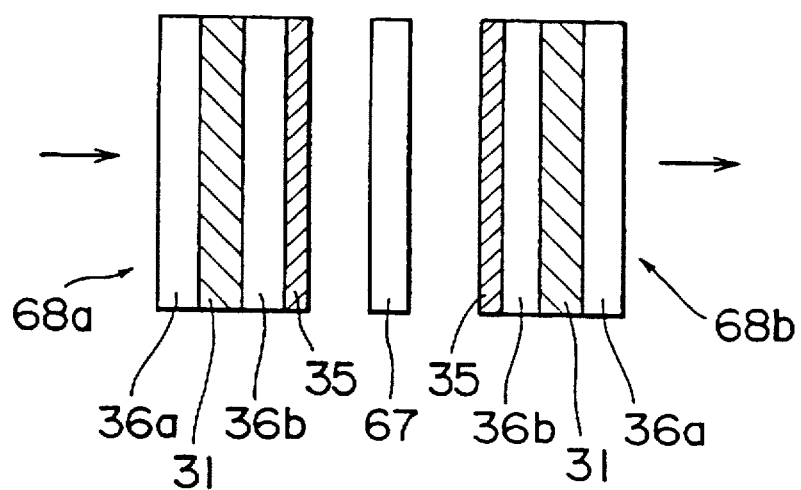
FIG. 6 is a sectional view schematically showing a conventional structure of the liquid crystal display of the invention.

A structure of the conventional liquid crystal display is shown in FIG. 6. In FIG. 6, a liquid crystal cell 67 comprises a pair of substrates provided with a transparent electrode and a twist-oriented nematic liquid crystal sealed therebetween, a pair of elliptically polarizing plates 68a and 68b indicated in FIG. 3 arranged on the both sides of the cell. The elliptically polarizing plate 68a is arranged on one side of the liquid crystal cell 67 in such a manner that the optical compensatory sheet 35 of the plate 58a faces the liquid crystal cell 67, and the elliptically polarizing plate 68b is arranged on another side of the liquid crystal cell 67 in such a manner that the optical compensatory sheet 35 of the plate 68b faces the liquid crystal cell 67.

The elliptically polarizing plate of the invention is, for example, prepared by the use of a polarizing film and at least one optical compensatory sheet.

The optical compensatory sheet has a direction of a minimum retardation inclined at 5 to 50 degrees from the normal of the sheet. The sheet can be, for example, prepared by forming an orientation layer on a transparent film and forming a layer from a discotic compound (preferably discotic liquid crystal) on the orientation layer by coating method.

As material of the transparent film (support) of the invention, any material can be employed, so long as they are transparent. The material preferably has a transmittance of not less than 80% and specially shows optical isotropy when it is viewed from a front side. Further, the film preferably has a negative uniaxial property and an optic axis in the normal line direction.

Therefore, the film is preferably prepared from materials having a small intrinsic birefringence, such as triacetyl cellulose. Such material is available on market by the trade name of Geonex (from Nippon Geon Co., Ltd.), Arton (from Japan Synthetic Rubber Co., Ltd.) and Fuji TAC (from Fuji Photo Film Co., Ltd.).

However, materials having a large intrinsic birefringence such as polycarbonate, polyarylate, polysulfone and polyethersulfone can be also employed by rendering the materials optically isotropic by appropriately controlling molecular orientation in a procedure of forming a film.

The transparent film preferably satisfies the condition of:

$$|nx-ny|/|nx-nz| \leq 0.2$$

in which nx and ny is main refractive indices within the film and nz is a main refractive index in a thickness direction of the film.

The transparent film also preferably satisfies the condition of:

$$0 \leq |nx-ny| \times d \leq 50 (nm)$$

and more preferably:

$$0 \leq |nx-ny| \times d \leq 20 (nm)$$

in which nx and ny has the same meanings as above and d is a thickness direction of the film.

Especially, the transparent film preferably satisfies the condition of:

$$20 \leq |(nx+ny)/2 - nz| \times d \leq 400 (nm)$$

in which nx, ny and nz have the same meanings as above, whereby the viewing angle can be greatly increased. Further, the transparent film preferably satisfies the condition of:

$$30 \leq |(nx+ny)/2 - nz| \times d \leq 150 (nm)$$

Figure 7:
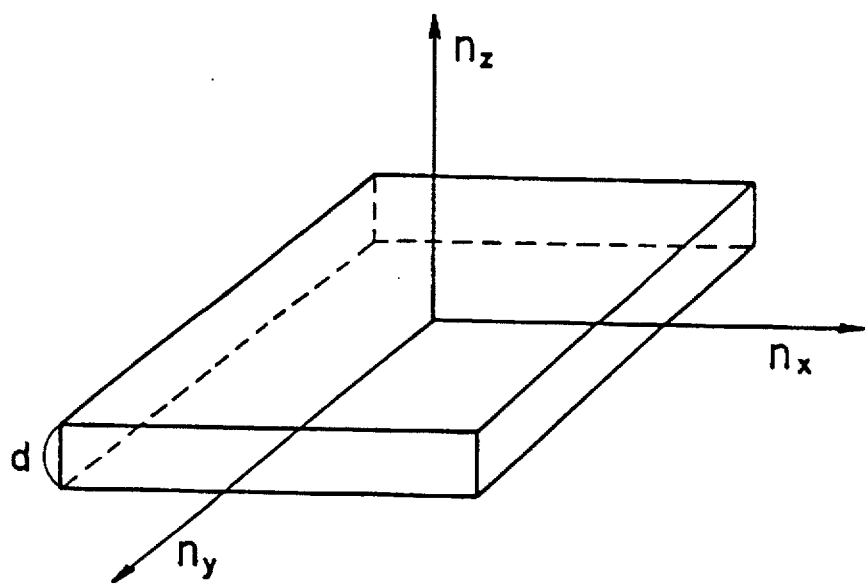
FIG. 7 is a view schematically showing the refractive indices of the three axes of the transparent film.

"nx", "ny", "nz" and "d" described above are shown in FIG. 7. "nx" and "ny" are main refractive indices on the plane of the film, "nz" is a main refractive index in a thickness direction of the transparent film and d is the thickness of the film.

The orientation layer is generally provided on the transparent film. The orientation layer has a function of defining an orientation direction of a discotic liquid crystal provided thereon by a coating method. The orientation layer is so prepared as to give to the discotic liquid crystal coated thereon a direction of a minimum retardation inclined at 5 to 50 degrees. As the orientation layer, any layers can be used, so long as they are capable of imparting orientation property to the layer of liquid crystal. Preferred examples of the orientation layer include a layer of an organic compound (preferably polymer) having been subjected to rubbing treatment, an obliquely deposited layer of an inorganic compound, and micro grooves provided on a film. Further, LB film comprising an azobenzene derivative, that is isomerized by means of light to form a thin film of the molecules tilted uniformly in a certain direction, can be used as the orientation layer. In addition, a layer prepared by orienting dielectric materials by application of electric field or magnetic field can be employed as the orientation layer.

Examples of polymers for the orientation layer include polyimide, polystyrene, gelatin, polyvinyl alcohol and polyvinyl alcohol having an alkyl group (preferably having 6 or more carbon atoms). Orientation layers obtained by subjecting films of these polymers to orientation treatment, are capable of tilting obliquely discotic liquid crystal.

The polyvinyl alcohol having an alkyl group is especially preferred from the viewpoint of uniform orientation of the discotic liquid crystal. It is presumed that interaction between the alkyl chain on the orientation layer and the discotic liquid crystal gives high orientation. The alkyl group of the polyvinyl alcohol is preferably present as a side or terminal group of the polyvinyl alcohol, and especially as a terminal group. The alkyl group preferably has 6–14 carbon atoms, and the alkyl group is preferably attached to the polyvinyl alcohol through —S—, —(CH$_3$)C(CN)— or —(C$_2$H$_5$)N —CS —S —. The polyvinyl alcohol preferably has a saponification value of not less than 80% and a degree of polymerization of not less than 200. The polyvinyl alcohol having an alkyl group is available as trade names of MP103, MP203 and R1130 (produced by Kuraray Co., Ltd.)

Preferred examples of the polyvinyl alcohol having an alkyl group are those having one of the following structures:

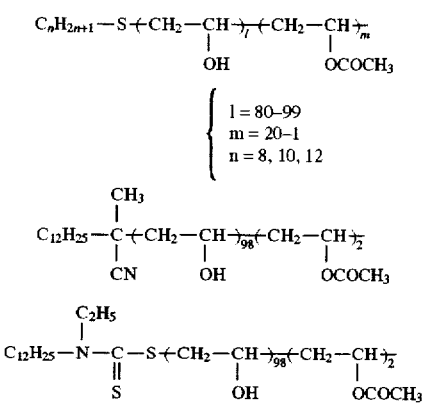

Polyimide film, which is widely used as an orientation layer for a liquid crystal cell, is also preferably used as the orientation layer of the invention. The polyimide film can be prepared by coating a solution of a polyamic acid (i.e., polyamide acid, e.g., a series of LQ/LX available from Hitachi Chemical Co., Ltd.; and a series of SE available from Nissan Chemical Industries, Ltd.) on the transparent support, dried at 100° to 300° C. for 0.5 to 1 hour, and rubbing a surface of the resultant polyimide film.

The orientation layer for the discotic liquid crystal can be rubbed in the known manner which is conventionally performed to prepare an orientation layer for liquid crystal of LCD. In more detail, the treatment comprises orienting a liquid crystal to a surface of the orientation layer by rubbing the surface in a certain direction by the use of a paper, a gauze, a felt, a rubber, or a fiber of polyamide or polyester. The rubbing procedure is generally performed by rubbing a surface of the orientation layer in several times using a cloth in which fibers having uniform length and width are arranged.

The orientation layer has a function of defining an orientation direction of a discotic liquid crystal provided thereon by a coating method. The orientation conditions of a discotic liquid crystal are dependent upon nature or the like of the orientation layer, and therefore the discotic liquid crystal and the orientation layer are chosen in most appropriate conditions.

For example, a discotic liquid crystal uniformly oriented is tilted at a certain angle (θ) to a surface of the support (transparent film), whereas the angle scarcely depends on nature of the orientation layer and mostly depends on nature or combination of discotic liquid crystals. Therefore, the angle can be finely controlled within a certain range by mixing two or more kinds of discotic liquid crystals or mixing a discotic liquid crystal and an analogous compound and at an appropriate mixing ratio. Thus, the angle of the oblique orientation is generally given by selecting the natures of discotic liquid crystals or mixing them.

As the orientation layer, an obliquely deposited film of an inorganic compound is employable in the invention. Examples of the inorganic compounds include metal oxides or metal fluorides such as SiO, $TiO_2$, $MgF_2$ and $ZnO_2$ and metals such as Au and Al. As the inorganic compound, any compounds can be employed, so long as they have high dielectric constant (permittivity). The obliquely deposited film of an inorganic compound can be prepared using the metallizing apparatus. The support may be metallized in the fixed condition, or the support may be continuously metallized to give a continuous film. In the case of using SiO as the evaporation material, vapor deposition at a deposition angle of 65 to 68 degrees gives an orientation layer on which a discotic liquid crystal is uniformly oriented in the direction where the deposited particle column and the direction of minimum retardation of the discotic liquid crystal almost intersect at right angle.

The optical compensatory sheet is preferably prepared by forming an orientation layer on a transparent film and forming a layer of discotic compound (preferably discotic liquid crystal (discotic liquid crystalline compound)) on the orientation layer, as mentioned above.

Examples of the discotic liquid crystals employed in the invention include the following compounds:

benzene derivatives described in C. Destrade et al., Mol. Cryst. vol. 71, pp. 111, 1981, cyclohexane derivatives described in B. Kohn et al., Angew. Chem. vol. 96, pp. 70, 1984, macrocyclic compounds of azacrown-type or phenylacetylene-type described in J. M. Lehn et al., J. Chem. Commun. pp. 1794, 1985, and J. Zhang et al., J. Am. Chem. Soc. vol. 116, pp.2655, 1994.

The discotic liquid crystal generally has a structure in that the above compound is located at a center of the crystal as a parent core and further straight chain groups such as alkyl, alkoxy and benzoyl having a substituent are radially bonded to the compound. As the discotic liquid crystals, any discotic liquid crystals can be employed, so long as the liquid crystals have negative uniaxial property and orientation property.

Preferred examples of the discotic liquid crystals employable in the invention are described below.

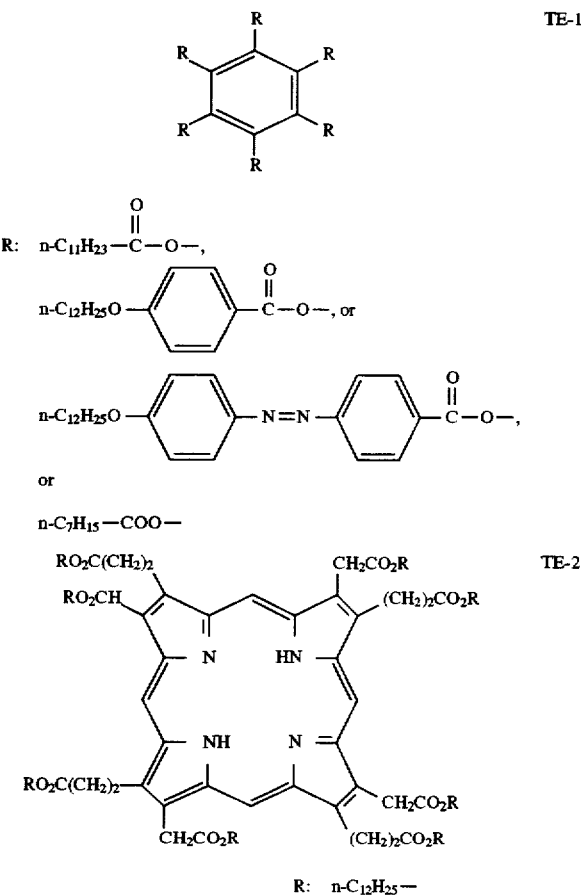

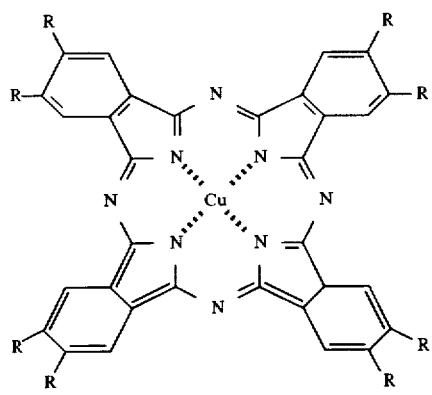
TE-3
R: n-C₁₂H₂₅OCH₂—
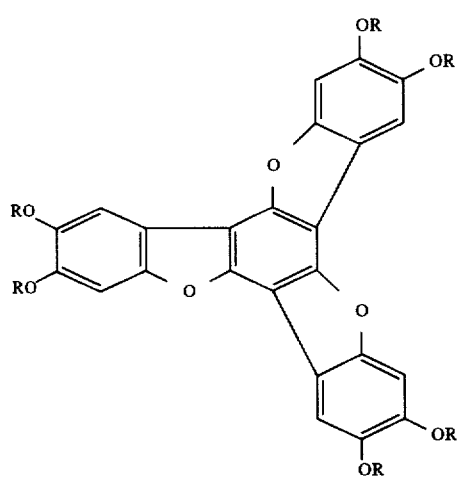
TE-4
R: n-C₁₂H₂₅O—⟨benzoyl⟩—C(=O)— or
n-C₁₃H₂₇CO—
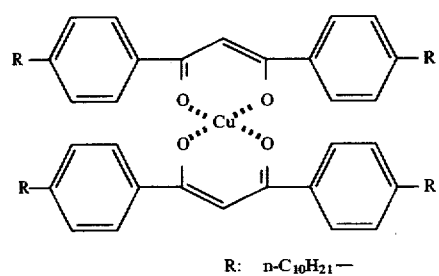
TE-5
R: n-C₁₀H₂₁—
TE-6
R: n-C₈H₁₇—
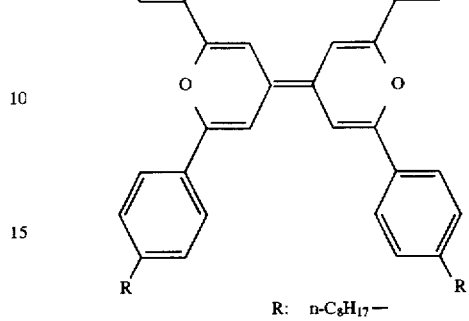
TE-7
R: n-C₁₆H₃₃O—
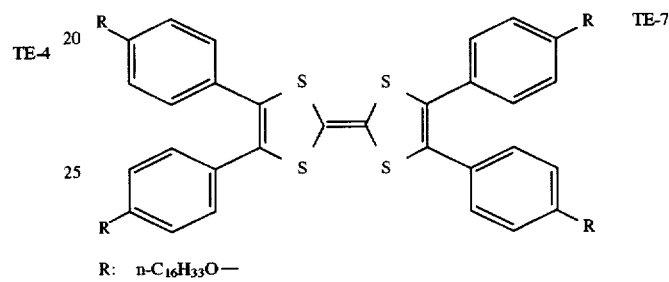
TE-8
R: (1) n-C$_m$H$_{2m+1}$O— (m = an integer of 2–15),
(2) n-C₈H₁₇—C(=O)—O—,
(3) n-C₈H₁₇O—C₆H₄—C(=O)—O—,
(4) n-C₇H₁₅O—C₆H₄—C(=O)—O—,
(5) n-C₅H₁₁O—C₆H₄—C(=O)—O—
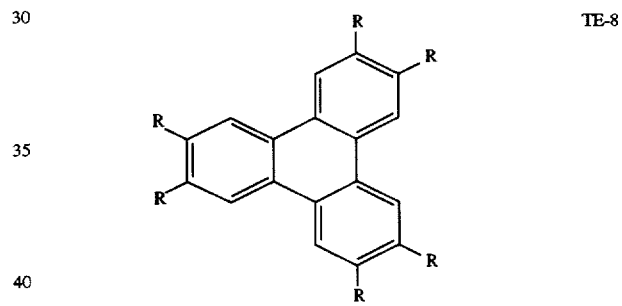

-continued (6)
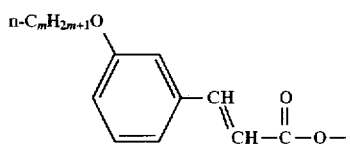

(m = an integer of 7–10),

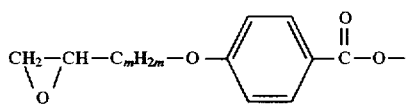

(m = an integer of 4–10), or

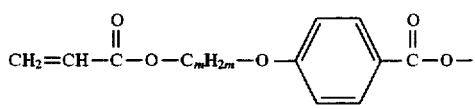

(m = an integer of 4–10)

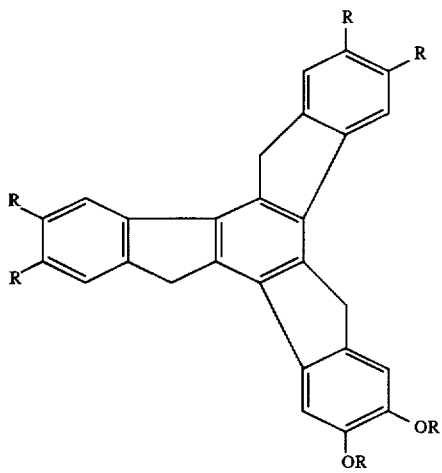

R: $n\text{-}C_{14}H_{29}\overset{O}{\underset{\|}{C}}-O-$,

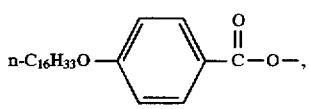

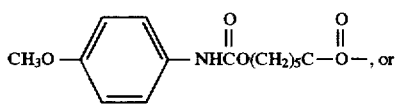

$n\text{-}C_{10}H_{21}O-$

-continued

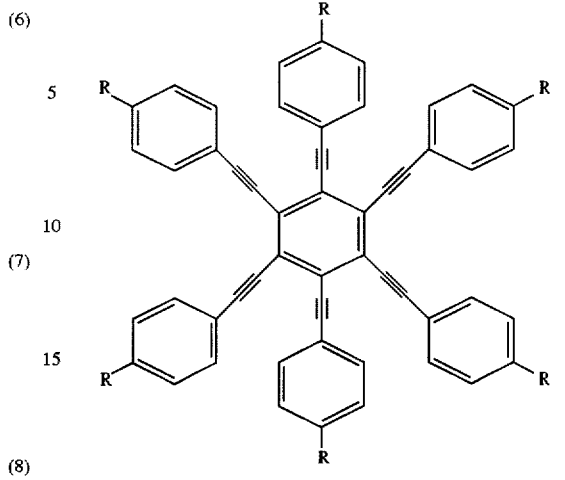

R: $C_7H_{15}O-$

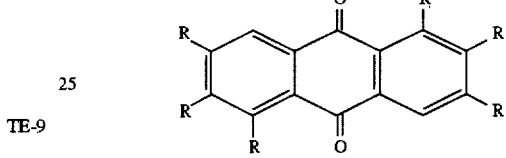

(1)
R: $n\text{-}C_{13}H_{27}\overset{O}{\underset{\|}{C}}-O-$ or (2)
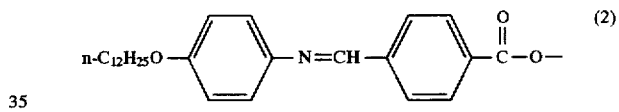

Examples of the layer of discotic liquid crystal of the invention include a layer of discotic liquid crystal of a low molecular weight, and a layer formed by polymerizing and/or cross-linking a discotic liquid crystal having a functional group capable of reacting or polymerizing by means of heat or light. The polymerized liquid crystal has no liquid crystal property. The layer of discotic liquid crystal preferably is a layer formed by polymerizing and/or cross-linking a discotic liquid crystal to keep the orientation condition of the discotic liquid crystal under the conditions of high temperature or humidity. Examples of the functional group of the discotic liquid crystal include a polymerizable unsaturated group, an epoxy group, an amino group and a carboxyl group. For example, the discotic liquid crystal having a polymerizable unsaturated group can be polymerized and/or cross-linked using heat- or photo-polymerization initiator by means of heating or light; the discotic liquid crystal having an epoxy group can be polymerized using light acid-releasing agent by means of light; and the discotic liquid crystal having an amino group or a carboxyl group can be cross-linked using a polyfunctional isocyanate compound or a polyfunctional epoxy compound by means of heating.

In the case that the discotic liquid crystal is once oriented on the orientation layer, the liquid crystal is stable at a temperature not higher than a transition temperature of from discotic nematic liquid crystal phase to solid phase. The discotic liquid crystal of the invention preferably has the transition temperature of 70° to 300°C. and especially 70° to 150°C. Therefore, an optical compensatory sheet containing the layer of the discotic liquid crystal is stable to heat. LCD to be loaded on a vehicle needs excellent heat-resistance. The layer of discotic liquid crystal formed by polymerizing and/or cross-linking mentioned above exhibits excellent heat-resistance, and therefore an optical compensatory sheet containing such layer is preferably used for LCD to be used in a motor car or other vehicles.

The optical compensatory sheet can be also prepared using optical isomerizable substance. The optical isomerization substance means one that can be converted into streoisomer or structural isomer by means of a light. The optical isomerizable substance preferably is one that can be reversely isomerized (i.e., returned to the original substance) by means of a light having wavelength different from that used in the above isomerization or by application of heat. The optical isomerizable substance is preferred to be a photochromic compound that causes change of its hue with that of its structure. Examples of the photochromic compound employed in the invention include azobenzene compounds, benzaldoxime compounds, azomethine compounds, fulgide compounds, diarylester compounds, cinnamic acid derivatives, retinal compounds and hemithioindigo compounds. The optical isomerizable substance further includes polymers having groups derived from the above compounds or derivatives. Such polymers may have an optical isomerization group on the main chain or the side chain.

The optical compensatory sheet can be, for example, prepared using the above optical isomerizable substance in the following manner.

A layer of the optical isomerizable substance (e.g., polymer) is obliquely irradiated with a light to prepare the sheet. Alternatively, the sheet can be obtained by obliquely irradiating a layer of the optical isomerizable substance and polymer with a light or by forming a layer of the optical isomerizable substance on a transparent film and obliquely irradiating the layer with a light.

Figure 8:
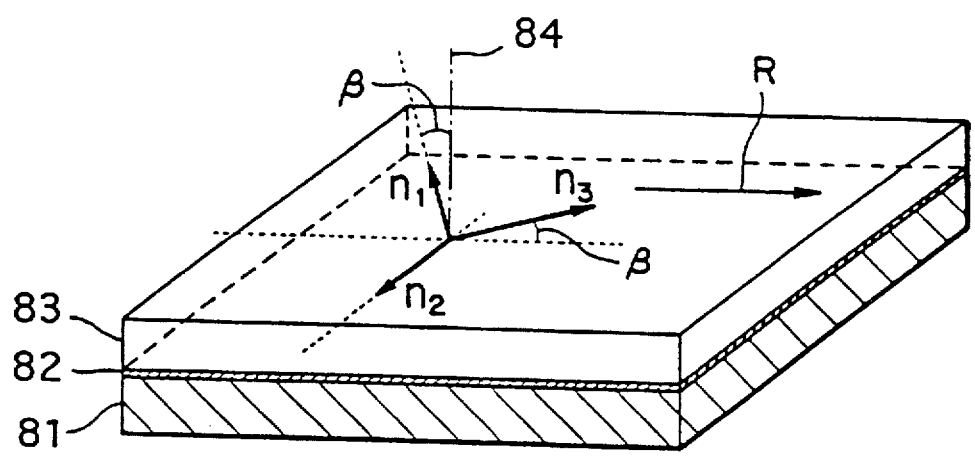
FIG. 8 is a view schematically showing the refractive indices of the three axes of the optical compensatory sheet.

A representative structure of the optically compensatory sheet employed in the invention is shown in FIG. 8. In FIG. 8, a transparent film 81, an orientation layer 82 and a layer of discotic liquid crystal 83 are superposed in order to form the optically compensatory sheet. The reference number R indicates the rubbing direction of the orientation layer. The reference numbers $n_1$, $n_2$ and $n_3$ indicate refractive indices in the three axes direction of the optical compensatory sheet, and $n_1$, $n_2$ and $n_3$ satisfy the condition of $n_1 \leq n_2 \leq n_3$, in the case that are seen in the front direction. The reference number β is an inclined angle of a direction of minimum retardation (including optic axis) against the normal 80 of the optical compensatory sheet.

In order to greatly improving viewing angle characteristics of TN-LCD or TFT-LCD, the direction of minimum retardation of the optical compensatory sheet is inclined at 5 to 50 degrees from the normal of the sheet (shown by β in FIG. 8), and preferably at 10 to 40 degrees.

Further, it is preferred that the optical compensatory sheet satisfies the condition of:

$$50 \leq [(n_3+n_2)/2-n_1] \times D \leq 400 \text{(nm)}$$

in which D is a thickness (in terms of nm) of the sheet.

The elliptically polarizing plate of the invention can be prepared by the use of a polarizing film and at least one optical compensatory sheet.

For example, the transparent film (support), the polarizing film and the above optical compensatory sheet are superposed in order, and simultaneously they are combined through pressing by the use of rollers to prepare an elliptically polarizing plate indicated in FIG. 1 or 2. In this case, to increase bonding strength between the transparent film and the polarizing film, and the polarizing film and the above optical compensatory sheet, an adhesive is employed. Examples of the adhesive include acrylic resin, SBR (styrene/butadiene rubber) and silicone resin. In the invention, the transparent film preferably is a film prepared from materials having a small intrinsic birefringence, such as triacetyl cellulose, as mentioned above. Such material is available on market by the trade name of Geonex (from Nippon Geon Co., Ltd.), Arton (from Japan Synthetic Rubber Co., Ltd.) and Fuji TAC (from Fuji Photo Film Co., Ltd.).

The polarizing film employable in the invention can be obtained by stretching a hydrophilic polymer such as partially saponified ethylene/vinylacetate copolymer, partially formalized polyvinyl alcohol or polyvinyl alcohol, and allowing the stretched film to adsorb thereon iodide or dichrolic dye; or by subjecting a plastic film such as polyvinyl chloride film to polyene orientation treatment.

The optical compensatory sheet employed in the elliptically polarizing plate of the invention obtained in the above manner is greatly improved in coloring of a displayed image and reversing of black-and-white image when the viewing direction is greatly inclined to height and width direction (upper or lower, or right or left) from the normal of the surface of the display. Thus, the liquid crystal display provided with the elliptically polarizing plate having the optical compensatory sheet shows excellent viewing characteristics such as enlargement of viewing angle.

The reason why the optical compensatory sheet employed in the invention gives much increase of viewing angle is assumed as follows:

Most of TN-LCD adopt normally white mode. In the mode, a light transmittance in a black display portion extremely increases with increase of viewing angle, which results in rapid reduction of contrast. In the condition of black display (the condition where voltage is applied), it is considered that TN-type liquid crystal cell shows an optically anisotropic property and a positive uniaxial property which is slightly inclined from a normal line to the surface of the cell.

In the case that the optic axis of the TN-type liquid crystal cell is inclined from the normal line (namely, normal) of the surface of the cell, use of a optically anisotropic substance having an optic axis in the normal line direction is considered not to appropriately compensate the phase difference by the cell. In other words, an optically anisotropic substance is needed for the cell to have an optic axis inclined from the normal line. Further, when the cell is regarded as a composite of optically anisotropic substances with a positive uniaxial property, an optically anisotropic substance having a negative uniaxial property is suitably used for compensation of phase difference by the cell. Thus, use of an optically anisotropic substance of a negative uniaxial property having optic axis inclined from the normal line improves viewing angle characteristics.

However, it is mere approximation that the liquid crystal cell behaves as optically anisotropic substance with a positive uniaxial property having optic axis inclined from the normal line. Therefore, the use of the optically anisotropic substance does not give satisfactorily compensation of phase difference.

The TN-type liquid crystal cell can be regarded as a composite of two optically anisotropic substances having a positive uniaxial property which has a inclined angle equal to each other and inclination direction differing from each other. When an intermediate gradation is displayed, optic axes of the optically anisotropic substances are further inclined from the normal line to the surface of the cell.

In the case that the TN-type liquid crystal cell is considered as above, great improvement of viewing angle characteristics can be obtained by employing the optical compensatory sheet which is prepared by, for example, superposing an optical anisotropic substance (discotic liquid crystal layer) on an optically anisotropic substance (transparent film) having an optically negative monoaxial property and an optic axis in the normal direction.

As materials of liquid crystal employed for the liquid crystal cell, any known materials can be employed so long as they are TN-CL or STN-CL.

Examples of the present invention, reference examples and comparison examples are given below, but these examples by no means restrict the invention.

EXAMPLE 1

Preparation of optical compensatory sheet (R-1) On a polyethersulfone film (thickness: 100 μm), a thin gelatin layer (approx. 2 μm) was formed.

On the gelatin layer, SiO was obliquely deposited using the continuous metallizing apparatus to form an orientation layer. The deposition was conducted under the conditions of film feeding rate of 7 m/minute, deposition source temperature of 1800K and minimum deposition angle of 65 degrees.

On the orientation layer, a coating solution obtained by dissolving 1 g of the discotic liquid crystal TE-8-(6) (m=7) (compound previously mentioned) and 2 mg of ethylene oxide adduct of nonylphenol (ethylene oxide : nonylphenol≈ 20:1, by mole) in 99 g of dichloromethane was coated and dried at room temperature. Thereafter, the coated layer was heated up 230° C., and subjected to heat treatment at this temperature to form a layer of the discotic liquid crystal having a thickness of 0.5 μm. Thus, an optical compensatory sheet (R-1) was obtained.

Preparation of elliptically polarizing plate (O-1)

The optical compensatory sheet (R-1) was bonded using an adhesive of acrylic resin to a polarizing film of iodine-containing polyvinyl alcohol (thickness: 30 μm) in such a manner that the discotic liquid crystal layer faced the polarizing film and the angle between the direction of a minimum retardation of the sheet and the polarizing axis was 22.5 degrees. The same polyethersulfone film as employed above was bonded on another side of the polarizing film. Thus, an elliptically polarizing plate (Q-1) of the invention illustrated in FIG. 2 was prepared.

EXAMPLE 2

Preparation of optical compensatory sheet (R-2) On a triacetyl cellulose film (thickness: 100 μm, available from Fuji Photo Film Co., Ltd.), a thin gelatin layer (approx. 3 μm) was formed.

On the gelatin layer, Sio was obliquely deposited in the same manner as Example 1 to form an orientation layer.

On the orientation layer, a coating solution obtained by dissolving 3 g of the discotic liquid crystal TE-8-(4) (compound previously mentioned) in 97 g of dichloromethane was coated and dried at room temperature. Thereafter, the coated layer was heated to 140° C., and subjected to heat treatment at the temperature to form a layer of the discotic liquid crystal having a thickness of 0.7 μm. Thus, an optical compensatory sheet (R-2) was obtain ed.

Preparation of elliptically polarizing plate (O-2)

The optical compensatory sheet (R-2) was bonded using an adhesive of acrylic resin to a polarizing film of iodine-containing polyvinyl alcohol (thickness: 30 μm) in such a manner that the triacetyl cellulose film faced the polarizing film and the angle between the direction of a minimum retardation of the sheet and the polarizing axis was 45 degrees. The same triacetyl cellulose film as employed above was bonded on another side of the polarizing film. Thus, an elliptically polarizing plate (Q-2) of the invention illustrated in FIG. 1 was prepared.

COMPARISON EXAMPLE 1

Preparation of elliptically polarizing plate (O-3)

A pair of the same triacetyl cellulose films as employed in Example 2 were bonded using an adhesive of acrylic resin to both sides a polarizing film of iodinecontaining polyvinyl alcohol (thickness: 30 μm) to prepare a polarizing plate. Subsequently, a biaxially stretched polycarbonate film having an inclining angle (β) of a direction of minimum retardation of 15 degrees and Δn·D of 120 nm (optical compensatory sheet), that was prepared by passing a biaxially stretched polycarbonate film between two rolls having peripheral rates different from each other, was bonded using an adhesive of acrylic resin to one triacetyl cellulose film of the polarizing plate in such a manner that the angle between the direction of minimum retardation of the polycarbonate film and the polarizing axis was adjusted to give 45 degrees. Thus, an elliptically polarizing plate (Q-3) for comparison illustrated in FIG. 3 was prepared.

REFERENCE EXAMPLE 1

Preparation of elliptically polarizing plate (O-4)

The same optical compensatory sheet (R-2) as prepared in Example 2 was bonded using an adhesive of acrylic resin to the triacetyl cellulose film of the same polarizing plate as that prepared in Comparison Example 1, in such a manner that the angle between the direction of a minimum retardation of the sheet and the polarizing axis was adjusted to give 45 degrees. Thus, an elliptically polarizing plate (Q-4) for reference was prepared.

[Evaluation of Optical Compensatory Sheets (R-1 and R-2)]

The thickness was measured with a micrometer, and Re values of various incident angles were measured by an ellipsometer (AEP-100, available from Shimadzu Seisakusho, Ltd.). Thus, the direction showing the minimum of Re (direction of a minimum retardation) was determined.

The inclining angle (β) of the direction of minimum retardation, the minimum retardation, Re in terms of $[(n_3+n_2)/2n_1] \times D$ $(=\Delta n \cdot D)$, and the thickness were set forth in Table 1.

TABLE 1

| Optical Compensatory Sheet | Thickness (μm) | Re (Δn · D) (nm) | Angle (β) of Direction of Min. Re | Minimum Re (nm) |
| --- | --- | --- | --- | --- |
| Ex. 1 (R-1) | 102.5 | 110 | 16° | 0 |
| Ex. 2 (R-2) | 103.7 | 130 | 14° | 0 |

[Evaluation of Elliptically Polarizing Plates (Q-1 to Q-4)]

Each of the obtained elliptically polarizing plates was bonded using an adhesive of acrylic resin to a glass plate to prepare a composite. The composite was allowed to stand in a thermostat of 70° C. for 500 hours and 1,000 hours. The resultant composite was visually observed to check occurrence of peeling between the films or the film and sheet of the elliptically polarizing plate, peeling between the elliptically polarizing plate and the glass plate, and shriveling on edges of the plate.

The result is set forth in Table 2.

TABLE 2

|  | 70° C./500 hours | | 70° C./1,000 hours | |
| --- | --- | --- | --- | --- |
|  | Peeling | Shriveling | Peeling | Shriveling |
| Ex. 1 (Q-1) | None | None | None | None |
| Ex. 2 (Q-2) | None | None | None | None |
| Co. Ex. 1 (Q-3) | None | Observed (on a part of four corners) | Observed (on upper edge) | Observed (on a part of four corners) |
| Re. Ex. 1 (Q-4) | None | Observed (on a part of four corners) | Observed (on upper and lower) edges) | Observed (on a part of four corners) |

As is apparent from Table 2, the elliptically polarizing plates obtained in Examples 1 and 2 showed no occurrence of peeling or shriveling after allowed to stand for long term under the condition of high temperature, whereas the elliptically polarizing plates obtained in Comparison Example 1 and Reference Example 1 had occurrence of peeling or shriveling.

EXAMPLE 3
Preparation of liquid crystal display of the invention

A pair of the elliptically polarizing plates (Q-1) obtained in Example 1 were fixed to both sides of TN-type liquid crystal cell that showed the product of the difference of refractive index between the extraordinary ray and the ordinary ray passing through the liquid crystal cell and the clearance between the substrates of the liquid crystal cell of 500 nm (i.e., product×clearance), and had a liquid crystal of a twisted angle of 90 degrees.

The obtained liquid crystal display (TN-LCD; K-1) had a structure shown in FIG. 5.

EXAMPLE 4
Preparation of liquid crystal display of the invention

The procedure of Example 3 was repeated except for using the elliptically polarizing plates (Q-2) obtained in Example 2 in place of the elliptically polarizing plates (Q-1) to prepare a liquid crystal display (TN-LCD; K-2) of the invention.

The obtained liquid crystal display (TN-LCD; K-2) had a structure shown in FIG. 4.

REFERENCE EXAMPLE 2
Preparation of liquid crystal display

The procedure of Example 3 was repeated except for using the elliptically polarizing plates (Q-4) obtained in Reference Example 1 in place of the elliptically polarizing plates (Q-1) to prepare a liquid crystal display (TN-LCD; K-3) for reference.

[Evaluation of Liquid Crystal Display]

To the TN-LCD, a rectangular wave of 30 Hz was applied at a voltage of 0 to 5 V, and contrasts in various incident angles were measured using a spectrophotometer (LCD-5000, available from Otsuka Electronics Co., Ltd.) to determine incident angle dependence of contrast. The angle against the normal at which the contrast $(T_{OV}/T_{SV})$ on a black-and-white display showed 5 was defined as viewing angle. The viewing angles in a height (upper-lower) direction and a width (left-right) direction of the TN-LCD were measured just after the preparation of the TN-LCD (condition (1)) and after the TN-LCD was allowed to stand in a thermostat of 70° C. for 750 hours (condition (2)).

The obtained results are set forth in Table 3.

TABLE 3

| Example | Viewing Angle (condition 1) | | Viewing Angle (condition 2) upper-lower (degree) |
| --- | --- | --- | --- |
|  | upper-lower (degree) | left-right |  |
| Ex. 3 (K-1) | 42–47 | 48–53 | 43–47 |
| Ex. 4 (K-2) | 39–44 | 43–48 | 38–45 |
| Re. Ex. 2 (K-3) | 38–42 | 42–47 | *37–43 |

*Shriveling was observed at four corners.

EXAMPLE 5
Preparation of transparent films (A-1 and A-2)

Triacetyl cellulose (weight-average molecular weight: 130.000, in terms of polystyrene) was dissolved in dichloromethane to prepare a polymer solution. The polymer solution was casted on a stainless steel belt, and peeled off just when the amount of volatile material came to 4 weight %, to prepare a continuous film. Then, the film was stretched in a widthwise direction (TD) and in a lengthwise direction (MD) and subjected to orientation relaxation by heating. In the above manner, triacetyl cellulose films having different surface orientation (A-1 and A-2) were prepared.

Preparation of optical compensatory sheet (B-1 for Ex. 5)

On the triacetyl cellulose film (A-2) prepared above, a coating solution containing polyvinyl alcohol having long chain alkyl groups (MP-203, produced by Kuraray Co., Ltd.) was coated, dried using warm air to form a layer of the polyvinyl alcohol (thickness: 0.8 μm), and rubbing a surface of the layer using a rubbing machine to form an orientation layer.

On the orientation layer, a coating solution obtained by dissolving a mixture of 0.4 g of the discotic liquid crystal TE-8-(8) (m=4) (compound previously mentioned), 0.04 g of trimethylolpropane triacrylate and 0.004 g of a photopolymerization initiator (Irgercure 907) in 1.6 g of methyl ethyl ketone was coated using a spin-coater at 150 rpm for 2 minutes. Thereafter, the coated layer was heated to 147° C. for 10 minutes to orient the discotic liquid crystal. Then, UV was irradiated onto the coated layer using a high pressure mercury lamp for 2 minutes at the temperature and slowly cooled to room temperature to form a layer of the discotic liquid crystal (D-1) having a thickness of 2 μm. Thus, an optical compensatory sheet (B-1) was obtained.

Preparation of elliptically polarizing slate (O-5, Ex. 5)

The transparent film (A-1) prepared above was bonded using an adhesive of acrylic resin to a polarizing film of iodine-containing polyvinyl alcohol (thickness: 30 μm) (S-1). The optical compensatory sheet having the discotic liquid crystal layer (B-1) prepared above was bonded to another side of the polarizing film (S-1) in such a manner that transparent film (A-1) faced the polarizing film and the direction of minimum retardation of the sheet and the polarizing axis was made parallel. Thus, an elliptically polarizing plate (Q-5) of the invention was prepared.

Preparation of polarizing slate (P-1)

A pair of the transparent films (A-1) prepared above were bonded using an adhesive of acrylic resin to both sides of a polarizing film of iodine-containing polyvinyl alcohol (thickness: 30 μm) (S-1). Thus, a polarizing plate (P-1) was prepared.

EXAMPLES 6 AND 7

Preparation of transparent films (A-3 and A-4)

Triacetyl cellulose (weight-average molecular weight: 130,000, in terms of polystyrene) was dissolved in dichloromethane to prepare a polymer solution. The polymer solution was casted on a stainless steel belt, and peeled off just when the amount of volatile material came to 4 weight %, to prepare a continuous film. Then, the film was stretched in a widthwise direction (TD) and in a lengthwise direction (MD) and subjected to orientation relaxation by heating. In the above manner, two triacetyl cellulose films having different surface orientation (A-3 and A-4) having the following optical characteristics were prepared.

Te films had almost negative uniaxial property and the optic axis almost was coincident with the direction of the normal of the film (see results in Table 4).

Preparation of optical compensatory sheet (B-2 for Ex. 6)

On the triacetyl cellulose film (A-3) prepared above, a thin layer of gelatin (0.1 μm) was formed. A coating solution containing polyvinyl alcohol having long chain alkyl groups (MP-203, produced by Kuraray Co., Ltd.) was coated on the gelatin layer, dried using warm air to form a layer of the polyvinyl alcohol (thickness: 0.8 μm), and rubbing a surface of the layer using a rubbing machine to form an orientation layer.

On the orientation layer, the discotic liquid crystal (D-1) having a thickness of 2 μm was formed in the same manner as in Example 5. Thus, an optical compensatory sheet (B-2) was obtained.

Preparation of optical compensatory sheet (B-3 for Ex. 7)

On the triacetyl cellulose film (A-4) prepared above, a thin layer of gelatin (0.1 μm) was formed. A coating solution containing polyvinyl alcohol having long chain alkyl groups (MP-203, produced by Kuraray Co., Ltd.) was coated on the gelatin layer, dried using warm air to form a layer of the polyvinyl alcohol (thickness: 0.8 μm), and rubbing a surface of the layer using a rubbing machine to form an orientation layer.

On the orientation layer, the discotic liquid crystal (D-1) having a thickness of 2 μm was formed in the same manner as in Example 5. Thus, an optical compensatory sheet (B-3) was obtained.

Preparation of elliptically polarizing plate (O-6, Ex. 6)

The transparent film (A-3) prepared above was bonded using an adhesive of acrylic resin to a polarizing film of iodine-containing polyvinyl alcohol (thickness: 30 μm) (S-1). The optical compensatory sheet (B-2) prepared above was bonded to another side of the polarizing film (S-1) in such a manner that transparent film (A-3) of the optical compensatory sheet (B-2) faced the polarizing film and the direction of minimum retardation of the sheet (B-2) and the polarizing axis was made parallel. Thus, an elliptically polarizing plate (Q-6) of the invention was prepared. The elliptically polarizing plate (Q-6) has a structure illustrated in FIG. 1.

Preparation of elliptically polarizing plate (O-7; Ex. 7)

The transparent film (A-3) prepared above was bonded using an adhesive of acrylic resin to a polarizing film of iodine-containing polyvinyl alcohol (thickness: 30 μm) (S-1). The optical compensatory sheet having the discotic liquid crystal layer (B-3) prepared above was bonded to another side of the polarizing film (S-1) in such a manner that transparent film (A-4) faced the polarizing film and the direction of minimum retardation of the sheet and the polarizing axis was made parallel. Thus, an elliptically polarizing plate (Q-7) of the invention was prepared. The elliptically polarizing plate (Q-7) has a structure illustrated in FIG. 1.

Preparation of Polarizing plate (P-2)

A pair of the transparent films (A-3) prepared above were bonded using an adhesive of acrylic resin to both sides of a polarizing film of iodine-containing polyvinyl alcohol (thickness: 30 μm) (S-1). Thus, a polarizing plate (P-2) was prepared.

[Evaluation of Transparent Films (A-1 to A-4) and Optical Compensatory Sheets (B-1 to B-3)]

The thickness was measured with a micrometer, and Re values at various incident angles were measured by an ellipsometer (AEP-100, available from Shimadzu Seisakusho, Ltd.). Thus, the direction showing the minimum of Re (direction of a minimum retardation) was determined.

The inclining angle (β) of the direction of minimum retardation, the minimum retardation (Re), Re in terms of $\{(n_3+n_2)/2-n_1\} \times D$ ($=\Delta n \cdot D$) (or $\{(nx+ny)/2-nz\} \times d$ in the case of support), and the thickness were set forth in Table 4.

TABLE 4

| Optical Compensatory Sheet | Thickness (μm) | Re ($\Delta n \cdot D$) (nm) | Angle (β) of Direction of Min. Re | Minimum Re (nm) |
|---|---|---|---|---|
| Transparent film (A-1) | 60 | 2 | 0 | — |
| Transparent film (A-2) | 105 | 58 | 0 | — |
| Transparent film (A-3) | 100 | 40 | 0 | — |
| Transparent film (A-4) | 100 | 60 | 0 | — |
| Ex. 5 (B-1) | 107 | 220 | 22 | 10 |
| Ex. 6 (B-2) | 107 | 220 | 22 | 10 |
| Ex. 7 (B-3) | 107 | 220 | 22 | 10 |

The layer of the discotic liquid crystal (D-1) constituting the optical compensatory sheet (B-1) was also subjected to the measurement. The measurement indicated a thickness of 2 μm, Re of 175 nm, and an inclining angle of 25 degrees.

EXAMPLES 8, 9, 10 AND 11 AND REFERENCE EXAMPLES 3 AND 4

Preparation of liquid crystal display (H-1, Ref. Ex. 3)

A pair of the optical compensatory sheets (B-1) were fixed to both sides of TN-type liquid crystal cell that showed the product of the difference of refractive index between the extraordinary ray and the ordinary ray passing through the liquid crystal cell and the clearance between the substrates of the liquid crystal cell of 500 nm (i.e., product×clearance), and had a liquid crystal of a twisted angle of 88 degrees. Further, a pair of the polarizing plates (P-1) obtained above were fixed to both side of TN-type liquid crystal cell (i.e., on the optical compensatory sheets).

The obtained liquid crystal display (TN-LCD; H-1) indicated in FIG. 6 was prepared.

Preparation of liquid crystal display (H-2; Example 8)

Two sheets of elliptically polarizing plates (Q-5) were fixed to both side of TN-type liquid crystal cell in a such a manner that the compensatory sheets of elliptically polarizing plates faced the cell. The cell showed the product of the difference of refractive index between the extraordinary ray and the ordinary ray passing through the liquid crystal cell and the clearance between the substrates of the liquid crystal cell of 500 nm (i.e., product ×clearance), and had a liquid crystal of a twisted angle of 88 degrees.

The liquid crystal display (TN-LCD; H-2) of the invention was prepared.

The obtained liquid crystal display (H-2) had a structure indicated in FIG. 4.

Preparation of liquid crystal display (H-3, Ref. Ex. 4)

A pair of the optical compensatory sheets (B-2) were fixed to both sides of TN-type liquid crystal cell that showed the product of the difference of refractive index between the extraordinary ray and the ordinary ray passing through the liquid crystal cell and the clearance between the substrates of the liquid crystal cell of 485 nm (i.e., product×clearance), and had a liquid crystal of a twisted angle of 90 degrees. Further, a pair of the polarizing plates (P-1) obtained above were fixed to both side of TN-type liquid crystal cell (i.e., on the optical compensatory sheets).

The obtained liquid crystal display (TN-LCD; H-3) indicated in FIG. 6 was prepared.

Preparation of liquid crystal display (H-4; Example 9)

Two sheets of elliptically polarizing plates (Q-6) were fixed to both side of TN-type liquid crystal cell in a such a manner that the compensatory sheets of elliptically polarizing plates faced the cell. The cell showed the product of the difference of refractive index between the extraordinary ray and the ordinary ray passing through the liquid crystal cell and the clearance between the substrates of the liquid crystal cell of 485 nm (i.e., product ×clearance), and had a liquid crystal of a twisted angle of 90 degrees.

The liquid crystal display (TN-LCD; H-4) of the invention was prepared.

The obtained liquid crystal display (H-4) had a structure indicated in FIG. 4.

Preparation of liquid crystal display (H-5; Example 10)

The procedure of Example 9 was repeated except for using the elliptically polarizing plate (Q-7) obtained above in place of the elliptically polarizing plate (Q-5) to prepare a liquid crystal display (TN-LCD; H-5) for reference.

In the preparation of the above liquid crystal displays (H-1 to H-5), the direction of minimum retardation of the optical compensatory sheet (B-1, B-2 or B-3) projected on the plane of the sheet, was arranged parallel to the rubbing axis of the liquid crystal cell and also to the polarizing axis.

[Evaluation of liquid crystal display]

To the TN-LCD, a rectangular wave of 40 Hz was applied at a voltage of 0 to 5 V, and transmittances (T) in various incident angles were measured by varying viewing angle using a spectrophotometer (LCD-5000, available from Otsuka Electronics Co., Ltd.) to determine incident angle dependence of transmittance (T). The angle against the normal at which the contrast ($T_{OV}/T_{SV}$) on a black-and-white display showed 10 was defined as viewing angle. From the measured data, viewing angles in a height (upper-lower) direction and a width (left-right) direction were determined.

The obtained results are set forth in Table 5.

TABLE 5

| | Viewing Angle | |
|---|---|---|
| | upper–lower | left–right |
| Example | (degree) | |
| Re. Ex. 3 (H-1) | 94 | 107 |
| Ex. 8 (H-2) | 109 | 111 |
| Re. Ex. 4 (H-3) | 84 | 108 |
| Ex. 9 (H-4) | 85 | 110 |
| Ex. 10 (H-5) | 85 | 110 |

The liquid crystal displays H-1 and H-3 (Reference Examples 3 and 4) needed bonding procedure four times because bonding of an elliptically polarizing plate and an optical compensatory sheet was conducted two times, and bonding of the composite and a liquid crystal cell was conducted two times (see FIG. 6). The liquid crystal displays H-2, H-4 and H-5 (Examples 8 to 10) needed bonding procedure only two times because bonding of an elliptically polarizing plate and a liquid crystal cell was conducted two times. Thus, the liquid crystal displays of the invention needed bonding procedure a half times as much as that of conventional one.

The displays prepared in Example 8 showed high viewing angle compared with those in Reference Example 3. The displays prepared in Examples 9 and 10 showed high viewing angle compared with those in Reference Example 4.

The durability placed under the conditions of high temperature and humidity of these displays were evaluated in the following manner.

The display was placed in a thermostat of 60° C., 10% RH for 12 hours and in a thermostat of 60° C., 60% RH for 12 hours, by turns. After 120 hours, the displays were observed. Occurrence of peeling and bubbles between the polarizing plate (P-1) and the optical compensatory sheet (B1 or B-2) at the corner of the display were observed on the displays of Reference Examples 3 and 4. No occurrence of the peeling and bubbles was found on the displays of Examples 8 to 10.

What is claimed is:

1. An elliptically polarizing plate comprising a polarizing film and an optical compensatory sheet provided thereon, wherein said sheet has a direction of a minimum retardation in the range of 2 to 20 nm which is inclined at 5 to 50 degrees from the normal of the sheet.

2. The elliptically polarizing plate as defined in claim 1, wherein the optical compensatory sheet has an oriented layer of a discotic compound.

3. The elliptically polarizing plate as defined in claim 1, wherein the optical compensatory sheet has an oriented layer of a discotic liquid crystal.

4. The elliptically polarizing plate as defined in claim 1, wherein the optical compensatory sheet comprises a transparent film and an oriented layer of a discotic liquid crystal provided thereon.

5. The elliptically polarizing plate as defined in claim 1, wherein the elliptically polarizing plate comprising the polarizing film, the optical compensatory sheet on one side of the film and a transparent film on another side of the film.

6. The elliptically polarizing plate as defined in claim 1, wherein the optical compensatory sheet comprises a transparent film, an oriented layer of a discotic liquid crystal provided thereon and an orientation layer provided therebetween.

7. The elliptically polarizing plate as defined in claim 1, wherein the optical compensatory sheet comprises a transparent film, an oriented layer of a discotic liquid crystal provided thereon and an orientation layer provided therebetween which is a polymer layer having been subjected to rubbing treatment.

8. The elliptically polarizing plate as defined in claim 1, wherein the optical compensatory sheet comprises a transparent film, an oriented layer of a discotic liquid crystal provided thereon and an orientation layer provided therebetween which is prepared by obliquely depositing an inorganic compound on the transparent film.

9. The elliptically polarizing plate as defined in claim 1, wherein the optical compensatory sheet has a transparent film which has a light transmittance of not less than 80%, shows optically isotropy on the plane of the film, and satisfies the condition of:

$$30 \leq \{(nx+ny)/2 - nz\} \times d \leq 150$$

in which nx and ny are main refractive indices on the plane of the support, nz is a main refractive index in the thickness direction, and d is the thickness of the film, unit of d being nm.

10. The elliptically polarizing plat as defined in claim 9, wherein the transparent film is a triacetyl cellulose film.

11. A liquid crystal display comprising a liquid crystal cell which comprises a pair of substrates provided with a transparent electrode and twist-oriented nematic liquid crystal sealed therebetween, and the elliptically polarizing plate defined in claim 1 which is arranged on at least one side of the cell.

12. A liquid crystal display comprising a liquid crystal cell which comprises a pair of substrates provided with a transparent electrode and twist-oriented nematic liquid crystal sealed therebetween, and two elliptically polarizing plates defined in claim 1 are arranged on both sides of the cell.

13. An elliptically polarizing plate comprising a polarizing film and an optical compensatory sheet provided thereon, wherein said sheet has a direction of a minimum retardation inclined at 5 to 50 degrees from the normal of the sheet and comprises a transparent film and an oriented layer of a discotic liquid crystal provided thereon, said transparent film having a light transmittance of not less than 80%, showing optically isotropy on the plane of the film, and satisfying the condition of:

$$30\{(nx+ny)/2-nz\}\times d \geq 150$$

in which nx and ny are main refractive indices on the plane of the support, nz is a main refractive index in the thickness direction, and d is the thickness of the film, unit of d being nm.

14. The elliptically polarizing plate as defined in claim 13, wherein the minimum retardation of the optical compensatory sheet is in the range of 2 to 20 nm.

15. The elliptically polarizing plate as defined in claim 13, wherein the elliptically polarizing plate comprising the polarizing film, the optical compensatory sheet on one side of the film and a transparent film on another side of the film.

16. The elliptically polarizing plate as defined in claim 13, wherein an orientation layer is provided between the transparent film and the layer of a discotic liquid crystal.

17. The elliptically polarizing plate as defined in claim 13, wherein an orientation layer is provided between the transparent film and the layer of a discotic liquid crystal, and the orientation layer is a polymer layer which has been subjected to rubbing treatment.

18. The elliptically polarizing plate as defined in claim 13, wherein an orientation layer is provided between the transparent film and the layer of a discotic liquid crystal, and the orientation layer is prepared by obliquely depositing an inorganic compound on the transparent film.

19. The elliptically polarizing plate as defined in claim 13, wherein the transparent film is a triacetyl cellulose film.

* * * * *